(12) United States Patent
Caballero

(10) Patent No.: US 9,047,420 B2
(45) Date of Patent: Jun. 2, 2015

(54) MANAGING DATA COMMUNICATION BETWEEN A PERIPHERAL DEVICE AND A HOST

(71) Applicant: Honeywell International, Inc., Morristown, NJ (US)

(72) Inventor: Aldo Caballero, Durham, NC (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 14/512,683

(22) Filed: Oct. 13, 2014

(65) Prior Publication Data

US 2015/0032920 A1 Jan. 29, 2015

Related U.S. Application Data

(60) Continuation of application No. 14/012,256, filed on Aug. 23, 2013, now Pat. No. 8,868,803, which is a division of application No. 13/267,338, filed on Oct. 6, 2011, now Pat. No. 8,539,123.

(51) Int. Cl.
| | |
|---|---|
| *G06F 13/38* | (2006.01) |
| *G06F 13/42* | (2006.01) |
| *G06F 13/10* | (2006.01) |
| *G06F 3/06* | (2006.01) |

(52) U.S. Cl.
CPC ............ *G06F 13/4221* (2013.01); *G06F 13/10* (2013.01)

(58) Field of Classification Search
None
See application file for complete search history.

(56) References Cited

U.S. PATENT DOCUMENTS

2008/0071963 A1* 3/2008 Chow et al. ............... 710/313

\* cited by examiner

*Primary Examiner* — Scott Sun
(74) *Attorney, Agent, or Firm* — Additon, Higgins & Pendleton, P.A.

(57) ABSTRACT

Management of data communication between a peripheral device and host computer system is provided. A peripheral device exposes to a host computer system multiple interfaces for data communication between the peripheral device and the host computer system. The multiple interfaces are exposed over a single physical interface between the peripheral device and the host computer system, for communicating data between the peripheral device and multiple applications executing on the host computer system. The multiple interfaces can include a data collection interface facilitating collection of data from the peripheral device by an application of the multiple applications executing on the host computer system.

20 Claims, 5 Drawing Sheets

MANAGING DATA COMMUNICATION BETWEEN A PERIPHERAL DEVICE AND A HOST

CROSS REFERENCE TO RELATED APPLICATIONS

The present application claims the benefit of U.S. patent application Ser. No. 14/012,256 for Managing Data Communication Between a Peripheral Device and a Host filed Aug. 28, 2013 (and published Dec. 26, 2013 as U.S. Patent Application Publication No. 2013/0346651), now U.S. Pat. No. 8,868,803, which claims the benefit of U.S. patent application Ser. No. 13/267,338 for Device Management using a Dedicated Management Interface filed Oct. 6, 2011 (and published Apr. 11, 2013 as U.S. Patent Application Publication No. 2013/0091311), now U.S. Pat. No. 8,539,123. Each of the foregoing patent applications, patent publications, and patents is hereby incorporated by reference in its entirety.

FIELD OF INVENTION

The invention relates to data communication and more particularly to management of data communication between a host computer system and peripheral device in communication with the host computer system.

BACKGROUND

Many types of peripheral devices connect to a host computer system on which one or more applications execute. Those who manage deployment of peripheral devices, for instance a business entity that owns point-of-sale systems comprising host computer systems attached to barcode scanning peripheral devices, routinely face the need to manage their deployed peripheral devices. Peripheral devices connect to host computer system using a variety of wired and/or wireless communication interfaces, including a wired Universal Serial Bus interface. Typically, peripheral devices utilizing a Universal Serial Bus connection expose a single Universal Serial Bus interface to the host computer. This single interface is commonly owned by a Line of Business application on the host computer, which, in the example involving a barcode scanner peripheral device, typically performs data collection from the scanner. Alternatively, if the scanner device is capable of exposing more than one interface across a physical interface connection, a problem arises when another utility or application desires to manage the scanner over the existing interface since typically none of the interfaces are intended to act as a secondary channel (back door) for scanner device management purposes. Such managing becomes challenging absent interference with normal scanner operation and performance expected by the Line of Business application. For instance, the Line of Business application would release the interface, freeing the interface for a management application to user the scanner, which can be impractical, problematic, and inefficient.

SUMMARY

The shortcomings of the prior art are overcome and additional advantages are provided through a method of managing data communication between a peripheral device and a host computer system, which method includes, for instance, a method for managing data communication between a peripheral device and a host computer system, the method comprising: exposing to the host computer system, by a processor of the peripheral device, multiple interfaces for data communication between the peripheral device and the host computer system, the multiple interfaces being exposed over a single physical interface between the peripheral device and the host computer system, the multiple interfaces for communicating data between the peripheral device and multiple applications executing on the host computer system, wherein the multiple interfaces comprise a data collection interface facilitating collection of data from the peripheral device by an application of the multiple applications executing on the host computer system.

Additional features and advantages are realized through the concepts of the present invention. Other embodiments and aspects of the invention are described in detail herein and are considered a part of the claimed invention.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
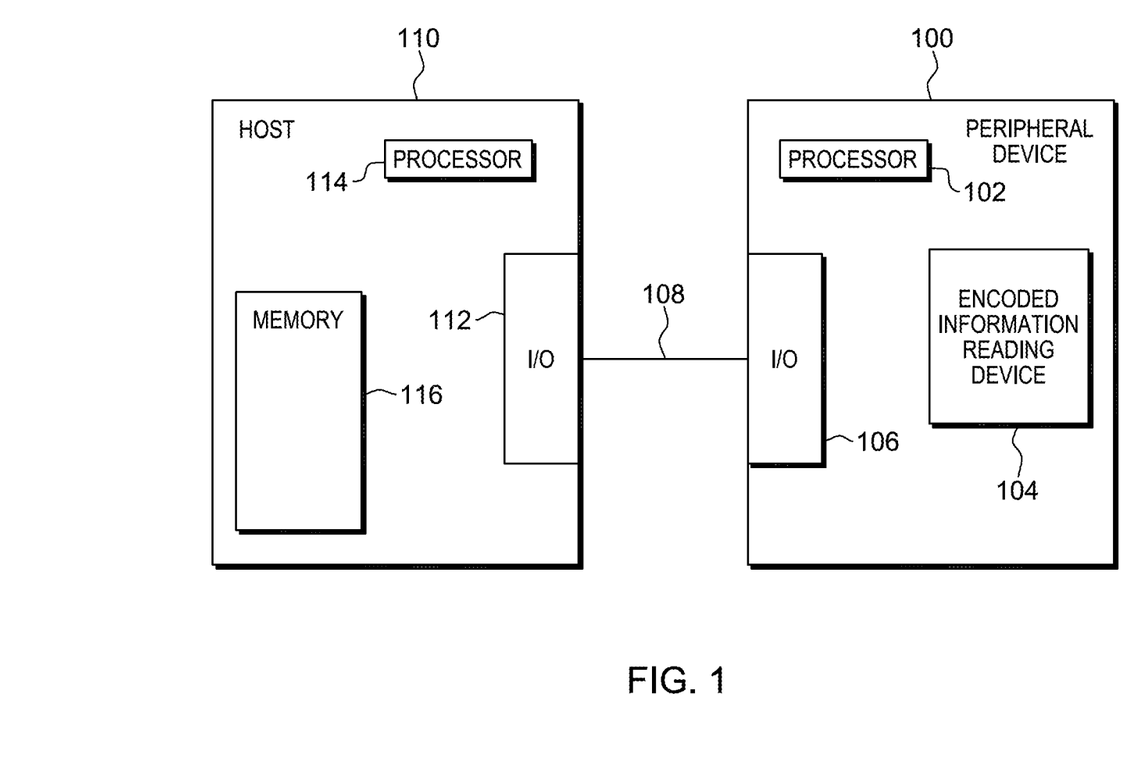
FIG. 1 depicts one embodiment of a host computer system in communication with a peripheral device, in accordance with one or more aspects of the present invention.

FIG. 1 depicts one embodiment of a host computer system in communication with a peripheral device, in accordance with one or more aspects of the present invention. In FIG. 1, peripheral device 100 communicates with host computer system 110 across communications link 108. Communications link can be any appropriate wired or wireless communication channel that supports analog or digital communication of data between peripheral device 100 and host 110. A non-limiting list of example communication links includes Universal Serial Bus, Wi-Fi™, and Bluetooth™ connections.

By way of specific example, peripheral device 100 is an encoded information reading terminal comprising a processor 102 (such as a CPU) and one or more encoded information reading device 104. Encoded information reading device 104 can be provided, e.g. by a bar code reading device, an RFID reading device, and a card reading device. Encoded information reading device 104 can be operative to output one or more of a decoded message decoded from raw signal or a raw signal comprising an encoded message. Shown in the block view as being provided by a separate unit external to processor 102 processing functionality of encoded information device 104 can be provided by processor 102. In operation of peripheral device 100, image signals can be read out of encoded information reading device 104 and stored into a volatile or non-volatile memory (not pictured), such as random access memory, read only memory, or any other type of storage memory. Processor 102 can be adapted to perform various algorithms including reading out image data stored in memory and/or algorithms supporting communication of data across communications link 108 via one or more I/O component(s) 106.

Host 110 similarly includes I/O component(s) 112. I/O components include one or more physical interfaces for communicating data to/from peripheral device 100. These interfaces comprise one or more hardware components. In the example of a Universal Serial Bus communications link, a supporting physical interface comprises a Universal Serial Bus port, as an example.

Host 110 also includes processor 114 (such as a CPU) and memory 116. Memory 116 can include one or more volatile or non-volatile memories of one or more types, such as random access memory, read only memory, or any other type of storage memory, such as a hard disk drive.

Figure 2:
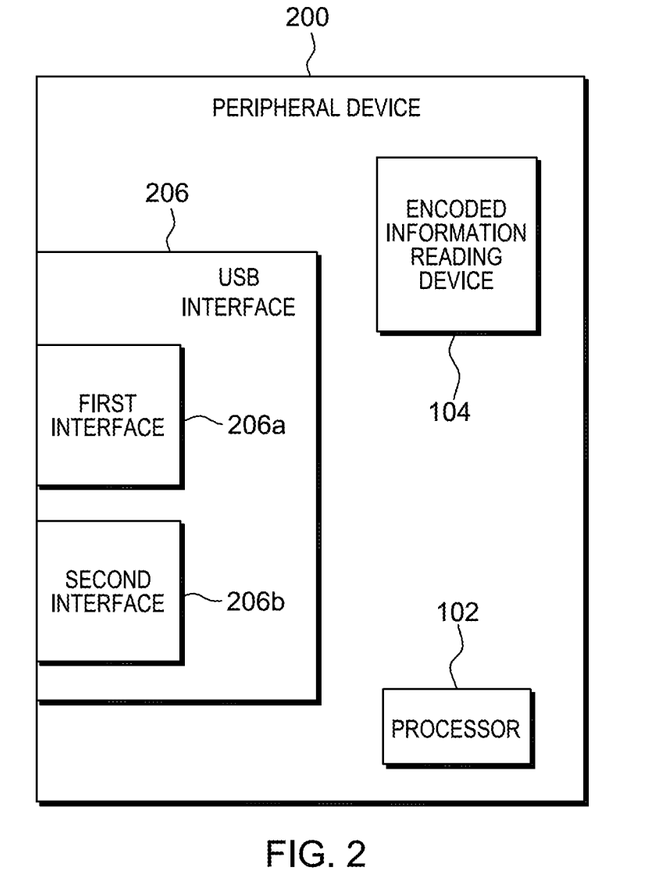
FIG. 2 depicts further details of a peripheral device, in accordance with one or more aspects of the present invention.

Further details of a peripheral device in accordance with one or more aspects of the present invention are described with reference to FIG. 2. In FIG. 2, peripheral device 200 includes processor 102 and encoded information reading device 104, as in FIG. 1. Additionally, peripheral device 200 includes a Universal Serial Bus physical interface 206. Typically, Universal Serial Bus physical interface 206 would present one interface for communication with an external device, such as a host computer. In accordance with one or more aspects of the present invention, one or more additional interfaces are created in physical interface 206 for presentation across, e.g., a single Universal Serial Bus physical communication link, such as a Universal Serial Bus Cable. An additional interface includes a dedicated management interface through which device management can be performed in parallel with a data collection processes. Thus, in FIG. 2, physical interface 206 includes a first interface 206a and a second interface 206b. While only two interfaces are depicted within physical interface 206 in FIG. 2, it should be understood that the number of interfaces presented within physical interface 206 could be any number of interfaces.

First interface 206a can be dedicated to device management, that is, it can be dedicated to data communication between one or more management applications on a host computer communicating with peripheral device 200. In this manner, data communications between the one or more management applications are received by peripheral device 200 via first interface 206a. Meanwhile, second interface 206b can be a data collection interface dedicated to communication between peripheral device 200 and another application on a host computer, such as a line of business application executing thereon for data collection. This facilitates both device management and data collection in parallel by separate applications executing on the host computer, without affecting performance or expected operation of the applications, thus simplifying the hardware and software components necessary to achieve this functionality. Further details of a host computer system in communication with a peripheral device in accordance with one or more aspects of the present invention are depicted in and described with reference to FIG. 3.

Figure 3:
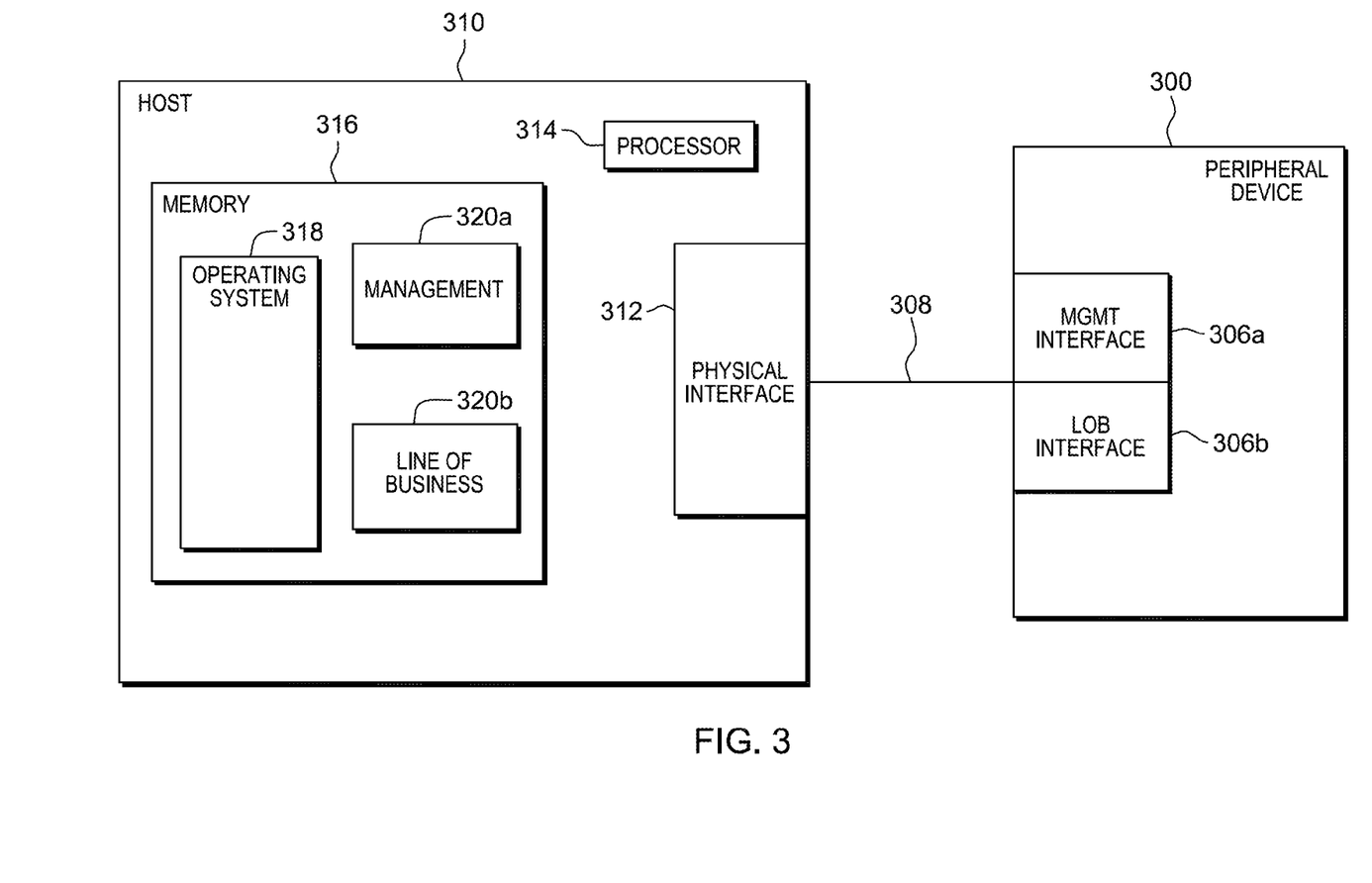
FIG. 3 depicts further details of a host computer system in communication with a peripheral device, in accordance with one or more aspects of the present invention.

In FIG. 3, host 310 includes processor 314 and memory 316. Host 320 also includes physical interface 312, comprising one or more hardware components, for communicating data to/from peripheral device 300. In this example, communications link 308 comprises a Universal Serial Bus communications link, and supporting physical interface 312 includes a Universal Serial Bus port.

As is understood by those having ordinary skill in the art, a processor can be configured to execute instructions of a program. Common such programs are an operating system and applications which run on the operating system from memory. In FIG. 3, processor 314 executes operating system 318 and applications 320a and 320b from memory 316. Application 320b comprises a line of business application. A line of business (LOB), in general, is a group of one or more related applications or modules which service a business need. In the context of host-peripheral device communication, a line of business application may be responsible for sending data to and/or receiving data from a peripheral device. In the specific example of a barcode scanner, the line of business application can execute on the host machine and accept from the peripheral device decoded data which is read-out from an encoded image (such as a barcode) using the peripheral device.

Application 320a in FIG. 3 comprises a management application. Management application 320a supports device management of a peripheral device, such as peripheral device 300. Examples of device management include performance of a firmware upgrade of the firmware of peripheral device 300, and performance of a reconfiguration of peripheral device 300, such as a reconfiguration to adjust one or more operating parameters of peripheral device 300.

In the example of FIG. 3, peripheral device 300 behaves as a Universal Serial Bus composite device listing multiple logical interfaces. Responsive to receiving a host enumeration command from host 310, peripheral device 300 responds by listing a dedicated management interface (306a) of a predefined type to facilitate management of peripheral device 300, and listing a line of business interface (306b) for data communication with line of business application 320b of host 310. Dedicated management interface 306a can be of a specific type that host operating system 318 matches to a preinstalled device driver, so that no custom driver for dedicated management interface 306a is needed. As those having ordinary skill in the art will recognize, device drivers for interfaces 306a and 306b enable host operating system 318 to recognize interfaces 306a and 306b exposed by peripheral device 300 to host 310 across communication link 308. Operating system 318 can then expose these interfaces to line of business application 320b and management application 320a executing on host 310.

In one embodiment, dedicated management interface 306a can be a Universal Serial Bus Human Interface Device (USB HID) class interface, for instance a barcode scanner interface, but with a non-standard usage page number that is not appealing to line of business application 320b as a data collection option. By using a non-standard page number (in this example), line of business application 320b will ignore the interface. Using a non-standard page number is just one way of using a non-standard configuration in order to cause line of business application 320b to ignore management interface 306a; there are many other ways of varying this configuration to expose management interface 306a in such as way that is it not appealing to line of business application 320b.

In operation, dedicated management interface 306a can receive special treatment from both management application 320a running on host 310 and from the firmware (not pictured) of peripheral device 300. For instance, on the host side, management application 320a can be configured to recognize management interface 306a, and be able to connect to it, enabling data communication between management application 320a and management interface 306a of peripheral device 300.

On the peripheral device side, commands received from host 310 through dedicated management interface 306a can be replied-to (from peripheral device 300 to host 310) using dedicated management interface 306a, rather than using another interface, such as line of business interface 306b. The opposite is also true: commands received from host 310 through line of business interface 306b can be replied-to using line of business interface 306b. Peripheral device 300 is therefore aware of which interface was the interface though which a command was received and is configured to reply to host 310 using that interface, so that the reply reaches the appropriate host application. This also enables peripheral device 300 to recognize unique commands when coming through dedicated management interface 306a, which may not be valid over line of business interface 306b.

Additionally, peripheral device 300 can send custom unsolicited notifications (i.e.: bar code reading statistics, low battery notifications, etc) over dedicated management interface 306a. These notifications can be provided across management interface 306a and not across line of business interface 306b, if so desired.

Peripheral device 300 can prioritize data communication through the different interfaces. For instance, in case multiple commands arrive concurrently over different interfaces, from applications on the host, peripheral device 300 can give priority to one of the interfaces over the other interface(s). As an example, the peripheral device can give priority to execute data collection events (e.g.: reading a barcode) on line of business interface 306b, so that the application performance of the data collection application (line of business application 320b on host 310) in not affected. Additionally, the peripheral device can be configured to always finish the execution of a request before processing a new request on the same or different interface (i.e.: adhere to the transaction concept to guarantee consistency of data). In this case, the new request, received during execution of a previously received request, may still be accepted and placed in a queue.

In a further enhancement, peripheral device 300 can be selectively configured for exclusive use of any one or more of the multiple interfaces to the host computer system. For instance, peripheral device 300 can include a special operation mode where the dedicated management interface becomes exclusive until the peripheral device is configured otherwise. There are various ways of achieving this including, but not limited to: signaling the host operating system that the other interface(s) are busy, temporarily blocking or placing on hold the other interface(s), or by queuing requests. Alternatively or additionally, the peripheral device could temporarily expose only one interface, such as the dedicated management interface, for exclusive use thereof. It may be important, in these scenarios to avoid reporting an error condition from the other applications, for instance the line of business application. This exclusive use of only the dedicated management interface can be enabled to facilitate performance of a firmware upgrade or peripheral device reconfiguration, as examples. By exclusively using the management interface, without having to worry about the other interface(s), the peripheral device can pay full attention to the particular management operation being requested, without interruption, and enabling it to dedicate the necessary hardware resources of the peripheral device (CPU, memory, etc) to the particular task. This can be advantageous in that, for limited-resource peripheral devices, communication errors are less frequent since the peripheral device is not stressed by trying to process requests on all interfaces.

Figure 4:
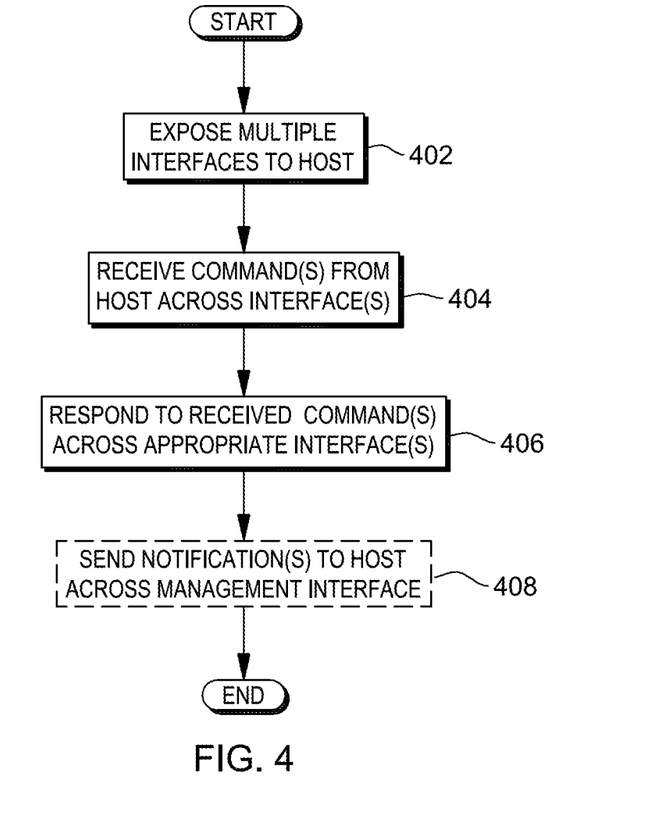
FIG. 4 depicts one example of a process for managing data communication between a peripheral device and host computer system, in accordance with one or more aspects of the present invention.

FIG. 4 depicts an example of a process for managing data communication between a peripheral device and host computer system, in accordance with one or more aspects of the present invention. The process begins by exposing multiple interfaces of a peripheral device to a host computer system (402). In one example, this is performed responsive to a host enumeration request by a host computer system. Next, peripheral device receives one or more commands from the host computer system across one or more of the multiple interfaces (404). The peripheral device can perform one or more operations responsive to receiving the one or more commands. Then, the peripheral device responds to the received command(s) across an appropriate interface of the multiple interfaces (406). As discussed above, an appropriate interface for responding to a command can be the interface through which the command was received. In this manner, requests received across a management interface of the multiple interfaces can be responded-to using the management interface, so that the proper management application executing on the host receives the response. Additionally, the peripheral device can optionally send one or more notifications to a management application of the host computer system across the management interface of the multiple interfaces (408).

Aspects of the present invention provide the existence of a dedicated interface with potentially special treatment by the peripheral device and the host computer. Aspects of the present invention can be applied to any type of interface used by a peripheral device, and thus can be applied to other types of interfaces (including those that are not physically limited to be a single interface), for instance Bluetooth™, WiFi™, or ZigBee interfaces.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 5:
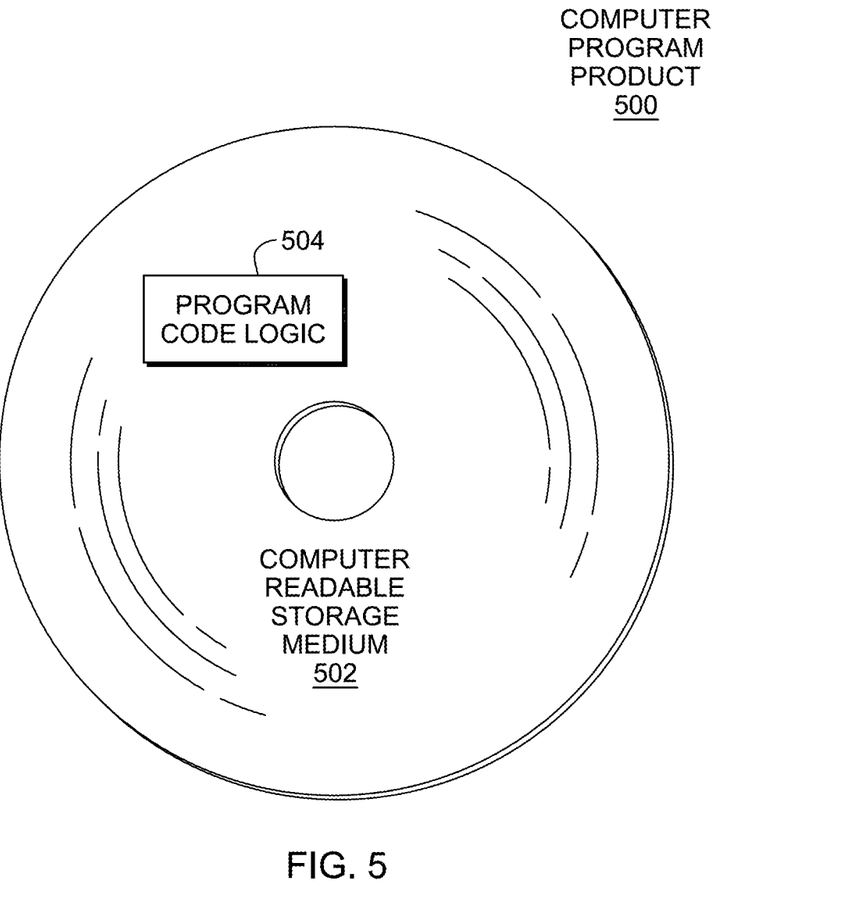
FIG. 5 depicts one embodiment of a computer program product to incorporate one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A small sample of methods that are described herein is as follows:

A1. A method for managing data communication between a peripheral device and a host computer system, the method comprising: exposing to the host computer system, by a processor of the peripheral device, multiple interfaces for data communication between the peripheral device and the host computer system, the multiple interfaces being exposed over a single physical interface between the peripheral device and the host computer system, the multiple interfaces for communicating data between the peripheral device and multiple applications executing on the host computer system, wherein the multiple interfaces comprise a dedicated management interface facilitating management of the peripheral device by a management application of the multiple applications executing on the host computer system.

A2. The method of A1, wherein the multiple interfaces further comprise a line of business interface for data communication between the peripheral device and a line of business application of the multiple applications, and wherein the dedicated management interface and the line of business interface are exposed separately to the host computer system to facilitate peripheral device management across the dedicated management interface in parallel with data collection across the line of business interface by the line of business application.

A3. The method of A1, wherein the single physical interface comprises a Universal Serial Bus interface.

A4. The method of A3, wherein the peripheral device behaves as a Universal Serial Bus composite device exposing the multiple interfaces responsive to a Universal Serial Bus host enumeration request.

A5. The method of A1, wherein the dedicated management interface comprises a Universal Serial Bus Human Interface Device class interface, wherein the peripheral device exposes the Universal Serial Bus Human Interface Device class interface as having a non-standard configuration so as to be ignored by a line of business application of the multiple applications executing on the host computer system.

A6. The method of A5, wherein the non-standard configuration comprises a non-standard usage page number of the Universal Serial Bus Human Interface Device class interface.

A7. The method of A1, further comprising receiving commands by the peripheral device from the host computer system across the multiple interfaces and responding to the received commands, wherein the peripheral device, in responding to a command, responds to the command across a same interface of the multiple interfaces through which the command was received from the host computer.

A8. The method of A7, wherein the peripheral device is configured to give priority to one interface of the multiple interfaces, responsive to contemporaneously receiving more than one command across more than one interface of the multiple interfaces.

A9. The method of A8, wherein priority is given to a data collection interface of the multiple interfaces over the dedicated management interface of the multiple interfaces, the data collection interface collecting barcode data for provision to a line of business application of the multiple applications executing on the host computer system.

A10. The method of A1, further comprising sending one or more notifications over the dedicated management interface to the host computer system, wherein the one or more notifications are not made available across the other interfaces of the multiple interfaces.

A11. The method of A10, wherein the one or more notifications comprise bar code reading statistics.

A12. The method of A10, wherein the one or more notifications comprise a low battery notification A13. The method of A1, wherein the peripheral device is selectably configurable to exclusively use of one interface of the multiple interfaces to facilitate performance of at least one of: a firmware upgrade, or a peripheral device reconfiguration.

A14. The method of A13, wherein exclusive use of one interface of the multiple interfaces comprises one of temporarily blocking requests through other interfaces of the multiple interfaces through the period of exclusive use of the one interface, or temporarily queuing requests through other interfaces of the multiple interfaces through the period of exclusive use of the one interface.

A15. The method of A1, wherein the peripheral device is selectably configurable to expose any one or more of the multiple interfaces to the host computer system.

A16. The method of A15, wherein the peripheral device is selectably configurable to expose only the dedicated management interface to facilitate performance of at least one of: a firmware upgrade, or a peripheral device reconfiguration.

A17. The method of A1, wherein the peripheral device is configurable to recognize commands received through the dedicated management interface as being valid, wherein the commands are not recognized as being valid if received through other interfaces of the multiple interfaces.

A18. The method of A1, wherein the single physical interface comprises at least one of: a Bluetooth interface, a WiFi interface, or a ZigBee interface.

A19. The method of A1, wherein the peripheral device comprises an encoded information reading device configured to output a decoded message, wherein data communicated between the peripheral device and the host computer system comprises the decoded message and wherein the decoded message is communicated to a line of business application of the multiple applications executing on the host computer system.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A method for managing data communication, comprising:
   exposing, using a processor of a peripheral device, multiple interfaces for data communication between the peripheral device and multiple applications executing on a host computer system over a single physical interface;
   wherein the multiple applications executing on the host computer system comprise a management application; and
   wherein the multiple interfaces comprise a dedicated management interface facilitating management of the peripheral device by the management application.

2. The method of claim 1, wherein:
   the multiple applications executing on the host computer system comprise a line of business application;
   the multiple interfaces comprise a line of business interface for data communication between the peripheral device and the line of business application; and
   the dedicated management interface and the line of business interface are exposed separately to the host computer system to facilitate peripheral device management across the dedicated management interface in parallel with data collection across the line of business interface by the line of business application.

3. The method of claim 1, wherein the peripheral device is selectably configurable to expose any of the multiple interfaces to the host computer system.

4. The method of claim 1, wherein the single physical interface comprises a Universal Serial Bus interface.

5. The method of claim 4, wherein the peripheral device behaves as a Universal Serial Bus composite device exposing the multiple interfaces responsive to a Universal Serial Bus host enumeration request.

6. The method of claim 1, wherein the dedicated management interface comprises a Universal Serial Bus Human Interface Device class interface, the method comprising exposing, using a processor of the peripheral device, the Universal Serial Bus Human Interface Device class interface as having a non-standard configuration so as to be ignored by a line of business application of the multiple applications executing on the host computer system.

7. The method of claim 6, wherein the non-standard configuration comprises a non-standard usage page number of the Universal Serial Bus Human Interface Device class interface.

8. A method for managing data communication, comprising:
   exposing, using a processor of a peripheral device, multiple interfaces for data communication between the peripheral device and multiple applications executing on a host computer system over a single physical interface;
   receiving commands with the peripheral device from the host computer system across the multiple interfaces; and
   responding to a received command, with the peripheral device, across a same interface of the multiple interfaces through which the command was received from the host computer system;
   wherein the multiple applications executing on the host computer system comprise a management application; and
   wherein the multiple interfaces comprise a dedicated management interface facilitating management of the peripheral device by the management application.

9. The method of claim 8, wherein the peripheral device is configured to give priority to one interface of the multiple interfaces responsive to contemporaneously receiving more than one command across more than one interface of the multiple interfaces.

10. The method of claim 8, wherein priority is given to a data collection interface of the multiple interfaces over the dedicated management interface of the multiple interfaces, the data collection interface collecting barcode data for provision to a line of business application of the multiple applications executing on the host computer system.

11. The method of claim 8, comprising sending a notification over the dedicated management interface to the host computer system, wherein the notification is not made available across other interfaces of the multiple interfaces.

12. The method of claim 11, wherein the notification comprises barcode reading statistics.

13. The method of claim 11, wherein the notification comprises a low battery notification.

14. A method for managing data communication, comprising:
   exposing, using a processor of a peripheral device, multiple interfaces for data communication between the peripheral device and multiple applications executing on a host computer system over a single physical interface;
   wherein the multiple applications executing on the host computer system comprise a management application;
   wherein the multiple interfaces comprise a dedicated management interface facilitating management of the peripheral device by the management application; and
   wherein the peripheral device is selectably configurable to exclusively use one interface of the multiple interfaces to facilitate performance of a firmware upgrade and/or a peripheral device reconfiguration.

15. The method of claim 14, wherein exclusive use of one interface of the multiple interfaces comprises (i) temporarily blocking requests through other interfaces of the multiple interfaces through a period of exclusive use of the one interface or (ii) temporarily queuing requests through other interfaces of the multiple interfaces through a period of exclusive use of the one interface.

16. The method of claim 14, wherein the peripheral device is selectably configurable to expose any of the multiple interfaces to the host computer system.

17. The method of claim 16, wherein the peripheral device is selectably configurable to expose only the dedicated management interface to facilitate performance of a firmware upgrade and/or a peripheral device reconfiguration.

18. The method of claim 14, wherein:
   the peripheral device is configurable to recognize commands received through the dedicated management interface as being valid; and
   the commands are not recognized as being valid if received through other interfaces of the multiple interfaces.

19. The method of claim 14, wherein the single physical interface comprises a Bluetooth interface, a WiFi interface, and/or a ZigBee interface.

20. The method of claim 14, wherein:
   the peripheral device comprises an encoded information reading device configured to output a decoded message;
   data communicated between the peripheral device and the host computer system comprises the decoded message; and
   the decoded message is communicated to a line of business application of the multiple applications executing on the host computer system.

* * * * *